(12) United States Patent
Orendorff et al.

(10) Patent No.: US 11,845,765 B1
(45) Date of Patent: Dec. 19, 2023

(54) ANION BINDING AGENT LITHIUM SALTS FOR BATTERY ELECTROLYTES

(71) Applicant: National Technology & Engineering Solutions of Sandia, LLC, Albuquerque, NM (US)

(72) Inventors: Christopher Orendorff, Albuquerque, NM (US); Ganesan Nagasubramanian, Albuquerque, NM (US); Kyle R. Fenton, Albuquerque, NM (US); David Ingersoll, Albuquerque, NM (US); Harry Pratt, Albuquerque, NM (US); Chad Staiger, Albuquerque, NM (US); Travis Mark Anderson, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 630 days.

(21) Appl. No.: 17/080,935

(22) Filed: Oct. 27, 2020

Related U.S. Application Data

(63) Continuation-in-part of application No. 16/260,593, filed on Jan. 29, 2019, now abandoned.
(Continued)

(51) Int. Cl.
*C07F 5/02* (2006.01)
*B01D 9/00* (2006.01)
(Continued)

(52) U.S. Cl.
CPC ............... *C07F 5/02* (2013.01); *B01D 9/005* (2013.01); *B01D 9/0022* (2013.01);
(Continued)

(58) Field of Classification Search
CPC ....... C07F 5/02; B01D 9/0022; B01D 9/0045; B01D 9/005; B01D 9/0059;
(Continued)

(56) References Cited

U.S. PATENT DOCUMENTS

| 6,248,883 B1* | 6/2001 | Gorkovenko | ......... C07C 311/48 558/44 |
| 2006/0040180 A1* | 2/2006 | Ivanov | ............. H01M 10/0568 429/188 |

(Continued)

FOREIGN PATENT DOCUMENTS

| CN | 101863489 A | * | 10/2010 | |
| CN | 102026948 A | * | 4/2011 | ........... C07C 231/02 |

(Continued)

OTHER PUBLICATIONS

Nagasubramanian et al., A New Family of Anion-Binding-Agent (ABA) Based Stable Salts for Li and Li-Ion Batteries; 2014, ECS, vol. MA2014, p. 1-6 (Year: 2014).*

(Continued)

*Primary Examiner* — Emmanuel E Duke
(74) *Attorney, Agent, or Firm* — Mark A. Dodd

(57) ABSTRACT

A method for synthesizing a purified lithium $(Li)^+$ anion binding agent $(ABA-F)^-$ salt and the corresponding $Li^+$ $(ABA-F)^-$ are disclosed. The method includes dissolving a boron-based acid in a polar solvent to form a solution. The solution is refluxed to form an anion binding agent. A stoichiometric amount of a small fluorinated salt, such as LiF, is added to the anion binding agent to form a mixture. The mixture is subsequently crystallized to obtain a substantially pure $Li^+(ABA-F)^-$ salt. Example purified $Li^+$ $(ABA-F)^-$ salts include $Ox-Li^+(ABA-F)$, $m-Li^+(ABA-F)$, and $BF_3$—$Li^+(ABA-F)^-$. These purified $Li^+(ABA-F)^-$ salts (Continued)

provide the benefits of increased battery thermal safety without loss of electrochemical performance.

11 Claims, 4 Drawing Sheets

Related U.S. Application Data

(60) Provisional application No. 62/624,360, filed on Jan. 31, 2018.

(51) Int. Cl.
  *H01M 10/61* (2014.01)
  *H01M 10/42* (2006.01)
  *H01M 10/0562* (2010.01)
  *H01M 10/0525* (2010.01)

(52) U.S. Cl.
  CPC ......... *B01D 9/0045* (2013.01); *B01D 9/0059* (2013.01); *H01M 10/0525* (2013.01); *H01M 10/0562* (2013.01); *H01M 10/4235* (2013.01); *H01M 10/61* (2015.04); *H01M 2300/008* (2013.01)

(58) Field of Classification Search
  CPC ......... H01M 10/0525; H01M 10/0562; H01M 10/4235; H01M 10/61; H01M 2300/008
  See application file for complete search history.

(56) References Cited

U.S. PATENT DOCUMENTS

2012/0276445 A1* 11/2012 Xu .................... H01M 10/0525
                                                             429/188
2017/0207485 A1*  7/2017 Fenton ................. H01M 4/385

FOREIGN PATENT DOCUMENTS

| | | | | | |
|---|---|---|---|---|---|
| CN | 102569891 | A | * | 7/2012 | |
| CN | 102569891 | A |   | 7/2012 | |
| CN | 102304143 | B | * | 4/2014 | |
| CN | 105742622 | A | * | 7/2016 | ............. C01G 53/50 |

OTHER PUBLICATIONS

Kumagae et al., Improvement of Cycle Performance of FeF3-Based Lithium-Ion Battery by Boron-Based Additives; 2016, ECS; Journal of The Electrochemical Society, 168(8) A1633-A1636. (Year: 2016).*
Ellis et al., Synergistic Effect of LiPF6 and LiBF4 as Electrolyte Salts in Lithium-Ion Cells; 2017, ECS; Journal of The Electrochemical Society, 164 A2426-A2433. (Year: 2017).*
Parimalam et al., Reduction Reaction of Electrolyte Salts for Lithium Ion Batteries: LiPF6, LiBF4, LIDFOB, LiBOB, and LiTFSI; 2018, ECS; Journal of The Electrochemical Society, 165 A251-A255 (Year: 2018).*
Zhang, An unique lithium salt for the improved electrolyte of Li-ion battery; 2006; Electrochemistry Communications 8 (2016) 1423-1428. (Year: 2006).*
Sun et al., Using a Boron-Based anion Receptor Additive to Improve the Thermal Stability of LiPF6-Based Electrolyte for Lithium Batteries; Electrochemical and Solid-State Letter, 5 (11) A248-A251 (Year: 2002).*
Aurbach, D. et al., "Review on electrode-electrolyte solution interactions, related to cathode materials for Li-ion batteries", Journal of Power Sources, 165 (2007), pp. 491-499.
Evertz, M. et al., "Development of a method for direct elemental analysis of lithium ion battery degradation products by means of total reflection X-ray fluorescence", Spectrochimica Acta Part B, 112 (2015) pp. 34-39.
Jang, D.H. et al., "Dissolution of Spinel Oxides and Capacity Losses in 4 V Li/LixMn2O4 Cells", J. Electrochem. Soc., vol. 143, No. 7 (1996), pp. 2204-2211.
Wang, R. et al., "Manganese dissolution from LiMn2O4 cathodes at elevated temperature: methylene methanedisulfonate as electrolyte additive", J. Solid State Electrochem., 20 (2016), pp. 19-28.
Yuan, X., CN-102569891-A English machine translation (Year: 2012) 11 pages.

* cited by examiner

ANION BINDING AGENT LITHIUM SALTS FOR BATTERY ELECTROLYTES

RELATED APPLICATIONS

This application claims priority to U.S. Provisional Application No. 62/624,360, filed on Jan. 31, 2018, and entitled ANION BINDING AGENT LITHIUM SALTS FOR BATTERY ELECTROLYTES, the entirety of which is incorporated herein by reference. This application is a continuation-in-part of U.S. application Ser. No. 16/260,593, filed Jan. 29, 2019, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present invention relates to alternative purified lithium salts and methods for synthesizing the alternative purified lithium salts.

BACKGROUND

The widespread adoption of lithium ion batteries, particularly in high energy applications such as electric vehicles and grid storage, has increased the need for ensuring safe and predictable performance. Limiting the severity of a thermal runaway would limit the impact of cell failures and improve the safety of these technologies in fielded systems.

Most conventional, commercial lithium-ion cells utilize electrolytes that contain lithium hexafluorophosphate ($LiPF_6$) salts. $LiPF_6$ is known to degrade thermally or in the presence of moisture to form HF. This HF is known to be highly toxic, with a NIOSH REL TWA 10-hour rating of 3 ppm (2.5 $mg/m^3$). This poses a significant health safety concern for lithium-ion battery failures, which is in addition to their heat and flame potential. Reducing heat generation during runaway offers a potential way to minimize both hazards during runaway. Additionally, lithium-ion battery failure modes often lead to cell rupture, electrolyte venting, and potential direct exposure to the end user of the battery.

In addition to health safety concerns, HF is known to leach manganese from common $LiMnO_2$ and $LiMn_2O_4$ cells. Manganese dissolution is a widely understood challenge to achieving optimum battery performance. See D. Jang et al., "Dissolution of Spinel Oxides and Capacity Losses in 4 V Li/$Li_xMn_2O_4$ Cells," J. Electrochemical Society, vol. 143, no. 7, pp. 2204-2211 (1996); D. Aurbach et al., "Review on electrode-electrolyte solution interactions, related to cathode materials for Li-ion batteries," J. Power Sources, vol. 165, pp. 491-499 (2007); R. Wang et al., "Manganese dissolution from $LiMn_2O_4$ cathodes at elevated temperature: methylene methanedisulfonate as electrolyte additive," J. Solid State Electrochemistry, vol. 20, pp. 19-28 (2015); and M. Evertz et al., "Development of a method for direct elemental analysis of lithium ion battery degradation products by means of total reflection X-ray fluorescence," Spectrochimica Acta Part B, vol. 112, pp. 34-39 (2015), each of which is incorporated herein by reference. HF is also known to react with other battery materials including solvents, binders, and packaging materials, thereby degrading electrochemical performance.

Accordingly, there is a need for improved safety and predictability of lithium ion batteries.

SUMMARY

Various embodiments of the present invention meet one or more of the needs stated above. A direct replacement of the $LiPF_6$ component with purified $Li^+(ABA-F)^-$, in accordance with various embodiments of the present invention, removes the primary mechanism to forming HF in lithium and lithium-ion cells. In addition, the Lewis acid behavior of the anion binding agent (ABA) serves to coordinate and bind any free F— from HF or other sources to a non-toxic complex, while reducing HF reactivity and manganese dissolution.

Various embodiments of the present invention enable new materials that have one or more of the following properties: (1) provide more chemically stable electrolyte salt alternatives to $LiPF_6$, (2) reduce the severity of thermal runaway reactions in lithium-ion cells, and (3) provide stability to manganese dissolution in a variety of cathode formulations such as $LiMnO_2$ and $LiMn_2O_4$ electrochemical cells.

In at least one embodiment of the present invention, a process for synthesizing a purified lithium salt comprises the steps of dissolving at least one boron-based acid in a solvent to form a solution, refluxing the solution to form an anion binding agent, adding a stoichiometric amount of a small fluorinated salt to the anion binding agent to create a mixture, and crystallizing the mixture to obtain the purified lithium salt.

In other embodiments of the present invention, the boron-based acid includes pentafluorobenzene boronic acid, trifluoromethyl boronic acid, or pentachlorobenzene boronic acid; the anion binding agent includes a neutral Lewis acid molecule; the anion binding agent includes an oxalic, a malonic, a lithium trifluoro, or a tris(penta)-based fluorophenylborane compound; the anion binding agent includes a molecule having either two carboxylic acid groups with bridging organic moieties or two alcohol groups with bridging organic moieties; the solvent includes acetone, toluene, dimethyl sulfoxide, methanol, or dimethylcarbonate; the small fluorinated salt is lithium fluoride (LiF) or lithium tetrafluoroborate ($LiBF_4$); a peak normalized heating rate for the purified lithium salt is less than 25° C./min; and greater than approximately 99% of the anion binding agent dissolved in the polar solvent is converted to the purified lithium salt.

In at least one embodiment of the present invention, a process for synthesizing a purified lithium salt comprises the steps of dissolving at least one boron-based acid and at least one of an oxalic and a malonic acid in a first solvent to form a first solution, refluxing the first solution and removing water therefrom using distillation to form a first mixture, vacuum filtrating the first mixture to form a first filtrate, washing the first filtrate with a non-polar solvent to form an anion binding agent, dissolving the anion binding agent in a polar solvent to form a second solution, adding a small fluorinated salt to the second solution to form a second mixture, filtering the second mixture to form a second filtrate, and evaporating the second filtrate to obtain the purified lithium salt.

In other embodiments of the present invention, the boron-based acid includes pentafluorobenzene boronic acid, trifluoromethyl boronic acid, or pentachlorobenzene boronic acid; the first solvent includes acetone, toluene, dimethyl sulfoxide, methanol, or dimethylcarbonate; the non-polar solvent is diethyl ether; the polar solvent is acetone; the small fluorinated salt is lithium fluoride (LiF) or lithium tetrafluoroborate (LiBF$_4$); and a peak normalized heating rate for the purified lithium salt is less than 25° C./min.

In at least one embodiment of the present invention, a process for synthesizing a purified lithium salt comprises the steps of dissolving at least one boron-based acid in a first solvent to form a first solution, adding hydrofluoric acid to the first solution to form a second solution, adding potassium hydroxide to the second solution to form a first precipitate, collecting the first precipitate by vacuum filtration to form a first filtrate, washing the first filtrate with methanol to form a third solution, drying the third solution to form an anion binding agent, adding LiBF$_4$ to the anion binding agent to form a second precipitate, filtering the second precipitate to form a second filtrate, and evaporating the second filtrate to obtain the purified lithium salt.

In other embodiments of the present invention, the boron-based acid includes pentafluorobenzene boronic acid, trifluoromethyl boronic acid, or pentachlorobenzene boronic acid; the first solvent includes acetone, toluene, dimethyl sulfoxide, methanol, or dimethylcarbonate; and a peak normalized heating rate for the purified lithium salt is less than 25° C./min.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

DETAILED DESCRIPTION

Various embodiments of the present invention correspond to alternative purified lithium salts that can be used in electrolytes for electrochemical energy storage systems based on anion binding agents (ABAs). Various embodiments of these purified salts have one or more of the following properties: (1) provide a more chemically stable electrolyte salt alternative to LiPF$_6$, (2) reduce the severity of thermal runaway reactions in lithium-ion cells, and (3) provide stability to manganese dissolution in a variety of cathode formulations such as LiMnO$_2$ and LiMn$_2$O$_4$ electrochemical cells.

An ABA is a neutral Lewis acid molecule which has an affinity for electronegative anions such as F$^-$, through coordination at the boron atom in the structure. Several common example materials of this type include tris(pentafluorophenyl)borane (TPFPB) and other acid-based ABAs such as oxalic, malonic, and lithium trifluoro-based fluorophenyl-borane compounds. The B-F coordination behavior of the ABA is a structure-function attribute of these molecules. Various embodiments of the present invention use lithium salts of ABAs to integrate their anion binding function directly into a purified electrolyte salt.

Purification by Synthesis

Figure 1A:
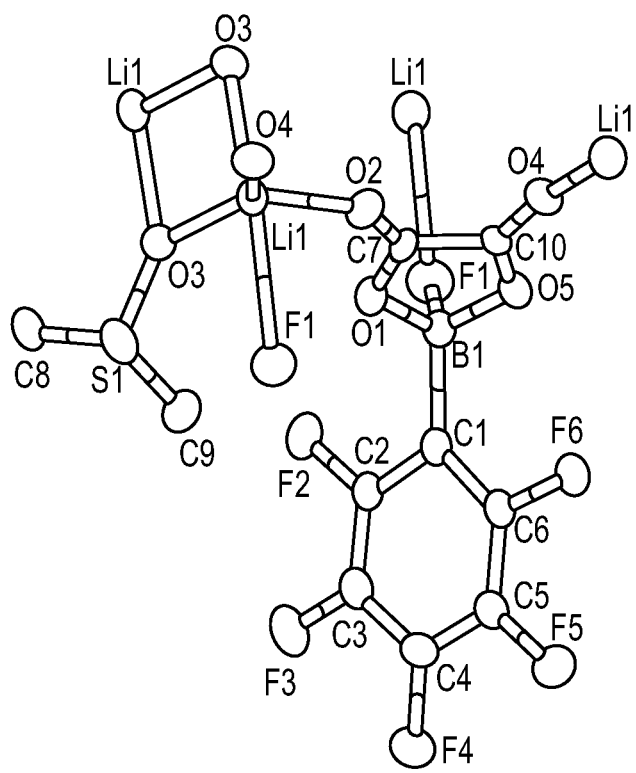
FIGS. 1A-1B are drawings illustrating x-ray structures of solvent-bound anion binding agent (ABA) and the B-F coordinated purified Li$^m$(ABA-F)$^-$ salt, respectively, in accordance with one or more embodiments of the present invention.
Figure 1B:
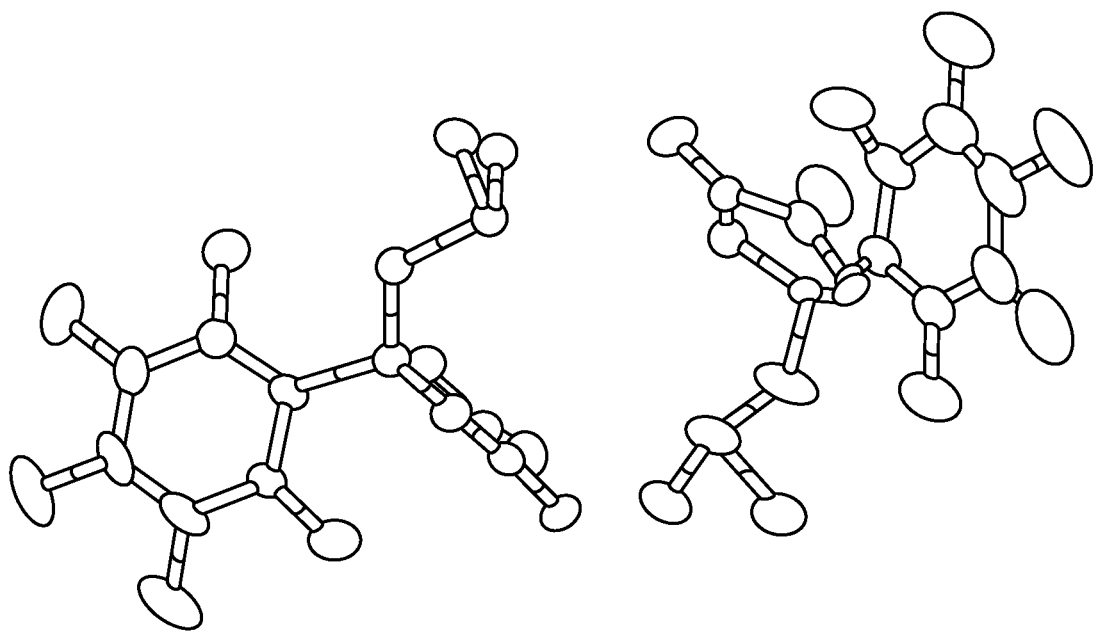

Conventional approaches to the synthesis of ABA molecules are performed in high dielectric organic solvents, such as dimethyl sulfoxide (DMSO). ABAs can have a significant presence of the solvent molecule coordination at the boron atom, which may be characterized by boron nuclear magnetic resonance (NMR) and x-ray crystallography. This inherently limits the B-F coordination ability of the ABA and its ability to improve battery performance. To address this, various embodiments of the present invention employ purification by synthesis to minimize boron-solvent interaction and promote B-F coordination by a direct synthesis route to the lithium-ABA salt: Li$^+$(ABA-F)$^-$. Drawings of the x-ray structures of the solvent bound ABA and the Li$^+$(ABA-F)$^-$ salt are shown in FIGS. 1A and 1B, respectively. Through synthesis of various embodiments of the present invention, NMR analysis showed that the amount of ABA-solvent converted to ABA-salt is greater than 99%. Stated another way, the purified ABA-salt contains less than 1% solvated ABA-salt. This results in the F atom being bound, thereby freeing up the Li atom. Various embodiments of the present invention employ other ABA compounds that have improved behavior for thermal runaway and electrochemical performance as compared to conventional compounds.

A method for purification by synthesizing one or more embodiments of the present invention includes dissolution of a prepared ABA in a solvent (e.g., acetone) followed by addition of a stoichiometric amount of LiF, then reflux to obtain a substantially pure Li$^+$(ABA-F)$^-$ salt, as confirmed by boron NMR measurements. Reports on similar prior art materials did not address the presence of an attached solvent molecule to the boron atom. Unlike various embodiments of the present invention, these prior art reports did not disclose a purification step that would remove residual solvent molecules from the Li$^+$(ABA-F)$^-$ salts. The present method allows for the synthesis of several new purified ABA-based salt materials with corresponding benefits of increased battery safety and electrochemical performance.

Figure 2A:
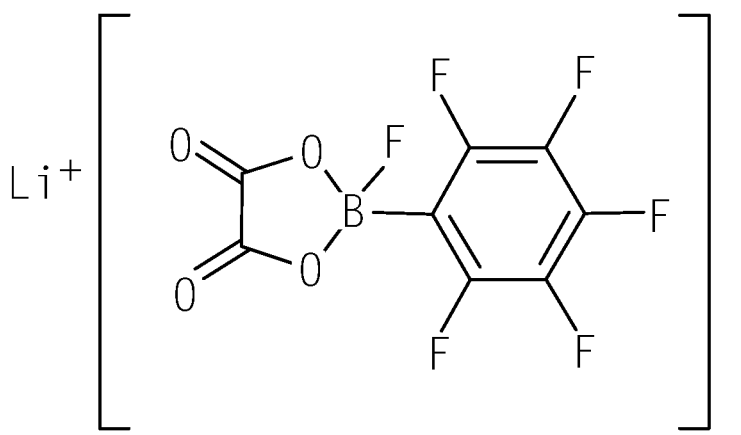
FIGS. 2A-2C are drawings showing chemical structures for purified ox-Li$^+$ (ABA-F)$^-$, purified m-Li$^+$(ABA-F)$^-$, and purified BF$_3$—Li$^+$(ABA-F)$^-$, respectively, in accordance with one or more embodiments of the present invention.
Figure 2B:
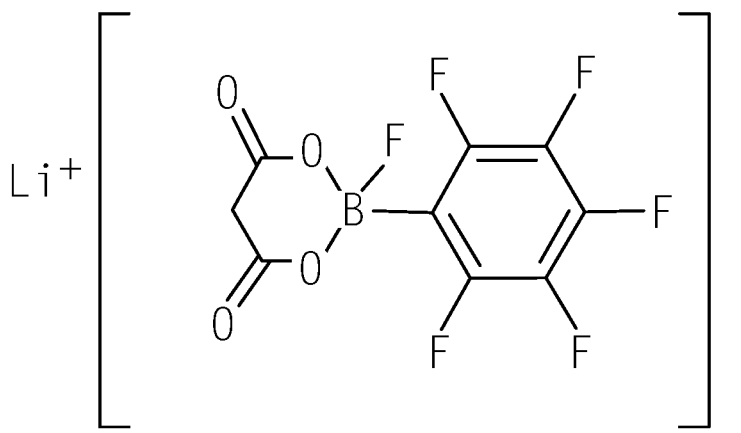
Figure 2C:
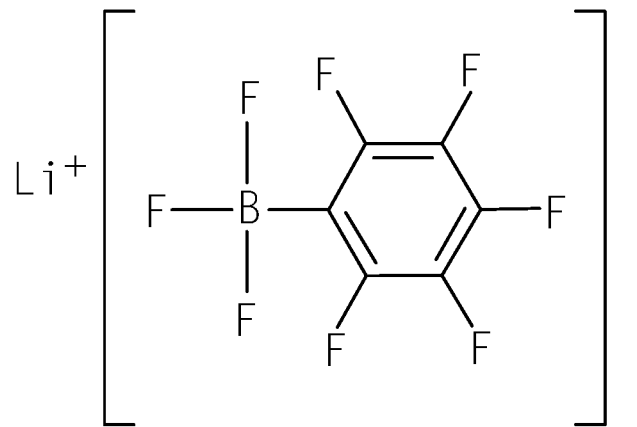

By way of non-limiting examples, several purified Li* (ABA-F)$^-$ salts including Ox-Li$^+$(ABA-F)$^-$, m-Li$^+$(ABA-F), and BF$_3$—Li$^+$(ABA-F)$^-$ were synthesized, as shown in FIGS. 2A-2C, respectively. These purified salts were characterized for conductivity, electrochemical voltage stability, and for thermal runaway energetics in 18650 cells. No thermal runaway data exists comparing the thermal runaway characteristics of cells with conventional salt-based electrolytes and those with ABA-based salts. Li$^+$(ABA-F)$^-$ salt synthesis can be used for implementation of the ABAs in Li-ion batteries.

A purified oxalic ABA LiF salt, shown in FIG. 2A, in accordance with one or more embodiments of the present invention, was synthesized using the following process. In a 100-mL flask fitted with a Dean Stark trap under argon, approximately 4.25 g of anhydrous oxalic acid (approximately 47 mmol) and approximately 10.0 g pentafluorobenzene boronic acid (approximately 47 mmol) were dissolved in approximately 50 mL of a 95:5 toluene/DMSO solution. The solution was brought to reflux with water being simultaneously removed by azeotropic distillation from the reaction and subsequently collected in the Dean Stark trap. After approximately 4 hours, a solid formed and approximately all of the anticipated water (approximately 1.7 mL) was collected, suggesting the reaction had gone to completion. Heating was stopped and the reaction mixture was allowed to cool to room temperature with continued stirring. The solid was then isolated by vacuum filtration. The precipitate was washed four times with approximately 100 mL aliquots of diethyl ether to yield an oxalic ABA in the form of a white solid.

The oxalic ABA (approximately 10 g) was dissolved in approximately 100 mL of dry acetone and then two equivalents of LiF were added. The resulting mixture was stirred overnight. Undissolved LiF was removed by filtration. The filtrate was concentrated by slow evaporation to give a white crystalline product. The structure of the resulting purified oxalic ABA LiF salt was confirmed by single crystal X-ray diffraction.

A purified malonic ABA LiF salt, shown in FIG. 2B, in accordance with one or more embodiments of the present invention, was synthesized under the same process previously described for the oxalic acid-based salt, but substituting 4.91 g of malonic acid (approximately 47 mmol) for the anhydrous oxalic acid.

A purified lithium trifluoro-ABA salt, shown in FIG. 2C, in accordance with one or more embodiments of the present invention, was synthesized using the following process. In a 20-mL polypropylene container, pentafluorobenzene boronic acid (approximately 1.0 g, 4.7 mmol) was dissolved in approximately 2.94 mL methanol. The solution was cooled to approximately 0° C. and approximately 2.94 mL of 5 M hydrofluoric acid was added dropwise. After the addition of hydrofluoric acid, 1.5 M potassium hydroxide (approximately 7.1 mL) was added dropwise. A precipitate formed and was collected by vacuum filtration. The precipitate was washed with cold methanol (approximately 50 mL) and dried under vacuum at room temperature to yield the difluoro-ABA.

The difluoro-ABA (approximately 1 g) and 1 equivalent of LiBF$_4$ were combined in dimethylcarbonate (approximately 20 mL) under argon. A precipitate formed while stirring overnight and was collected using vacuum filtration. The precipitate was dried under vacuum at room temperature to yield the purified lithium trifluoro-ABA salt.

While the above described embodiments of the present invention employed ABAs in the form of oxalic, malonic, and lithium trifluoro-based fluorophenylborane compounds, other embodiments of the present invention employ alternative ABAs, for example, maleic-based fluorophenylborane and other molecules with two carboxylic acid groups with bridging organic moieties or two alcohol groups, such as ethylene glycol, with bridging organic moieties. While ABA synthesis can involve a variety of polar solvents, the preferred solvents are acetone, toluene, dimethyl sulfoxide, and dimethylcarbonate. While the above described embodiments of the present invention employed LiF, other small fluorinated salts such as LiBF$_4$, may be employed. While the above described embodiments of the present invention employed pentafluorobenzene boronic acid, other boron-based acids with electron withdrawing groups such as fluorine or chlorine, for example, trifluoromethyl boronic acid or pentachlorobenzene boronic acid, may be employed.

Electrical Characterization

Figure 3:
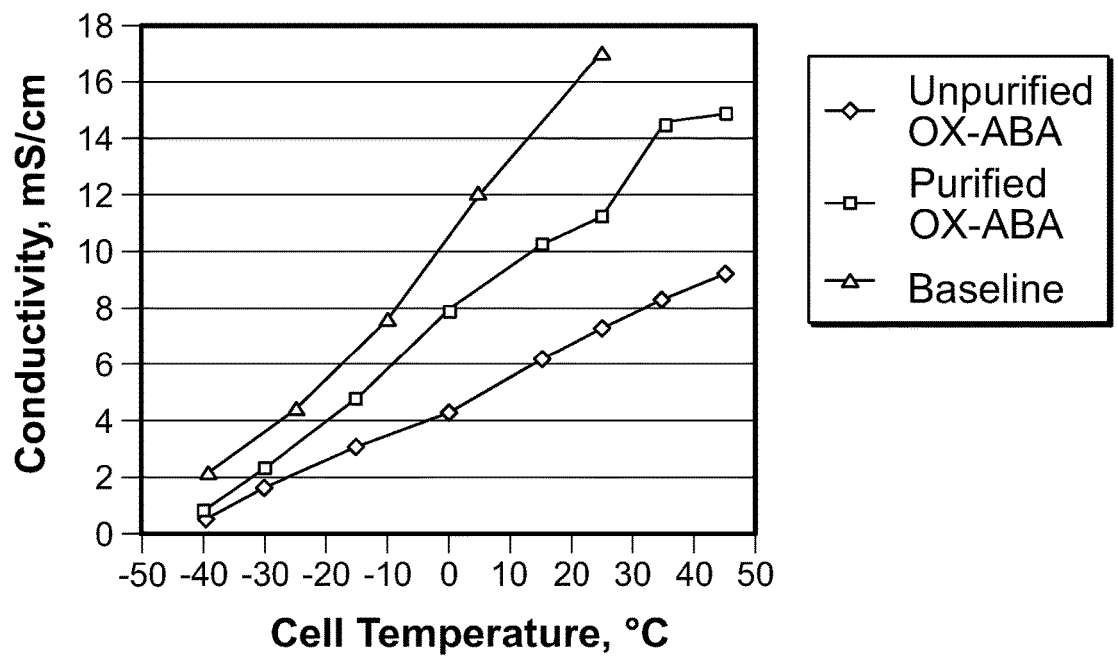
FIG. 3 is a graph showing conductivity versus temperature for baseline EC:EMC electrolyte, unpurified ox-ABA, and purified ox-ABA, in accordance with one or more embodiments of the present invention.

Lithium-ion electrolyte salts should have high ionic conductivity in order to support high rate ionic transport. FIG. 3 shows a plot of ionic conductivity as a function of temperature for three electrolytes: 1.2 M LiPF$_6$ (prior art, baseline), 1.0 M solvent bound LiF/ABA (prior art, unpurified), and 1.0 M Li$^+$(ABA-F)$^-$ (one embodiment of the present invention, purified), each in a blended mixture of ethylcarbonate (EC) and ethylmethyl carbonate (EMC) in a 3:7 weight % ratio (EC:EMC). At ambient temperature, the conductivity of the purified Li$^+$(ABA-F)$^-$ electrolyte is comparable to the conductivity of the prior art LiPF$_6$ electrolyte, 10 and 14 mS/cm, respectively. The prior art, unpurified solvent bound LiF/ABA electrolyte has significantly lower electrolyte conductivity, which is consistent with the inability of the solvent-bound ABA to coordinate F$^-$ and transport Li$^+$.

Figure 4:
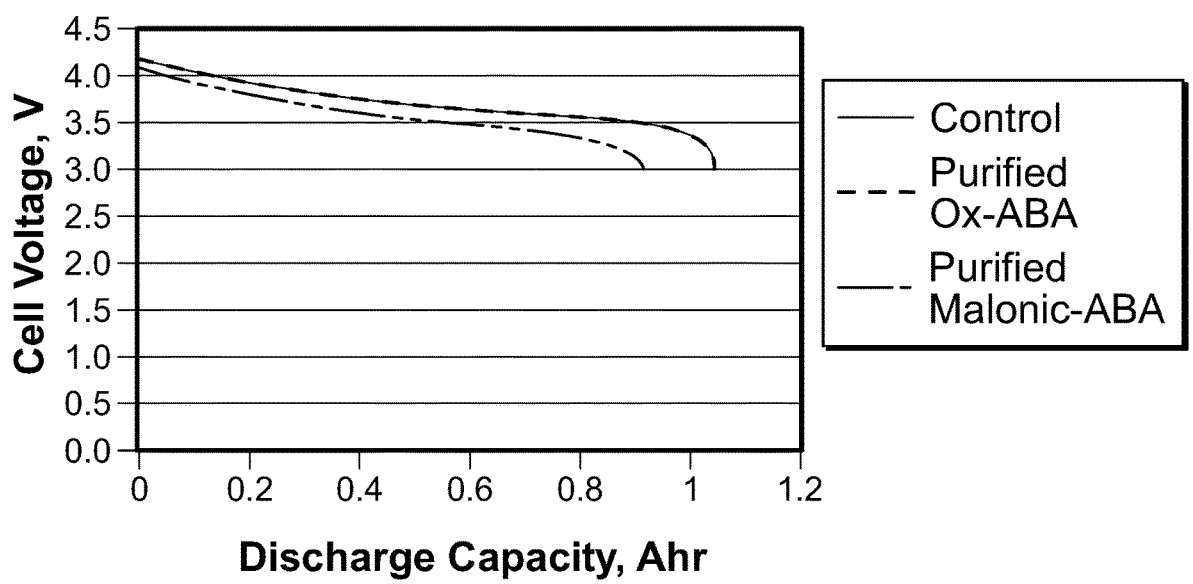
FIG. 4 is a graph showing discharge profile comparison for NCM 523/Graphite 18650 cells containing baseline EC:EMC electrolyte, purified ox-ABA, and purified malonic-ABA, in accordance with one or more embodiments of the present invention.

FIG. 4 shows cell voltage as a function of discharge capacity for lithium-ion 18650 cells with 1.2 M LiPF$_6$ in EC:EMC (prior art, baseline) and 1.0 M Li$^+$(ABA-F)$^-$ in EC:EMC (both purified oxalic-ABA and purified malonic-ABA embodiments of the present invention) measured at a discharge rate of C/5. These results suggest the electrochemical performance of both of these embodiments of the present invention at C/5 at the beginning of life to be comparable to the prior art.

Thermal Runaway Characterization

The widespread adoption of lithium ion batteries, particularly in high energy applications such as electric vehicles and grid storage, has increased the need for ensuring safe and predictable performance. By limiting the severity of a thermal runaway event, one can reduce the impact of cell failures and improve the safety of these battery technologies in fielded systems.

One technique used to quantify thermal runaway energetics is accelerating rate calorimetry (ARC) because of its ability to measure large heat release rates (>10° C./min). The purified ABA-based electrolytes in accordance with various embodiments of the present invention have significant benefits to the overall runaway enthalpy for lithium ion cells. 18650 cells containing both purified and unpurified ABA-based electrolytes show significant decreases in overall enthalpy output during thermal runaway compared to prior art LiPF$_6$ EC:EMC cells.

Figure 5:
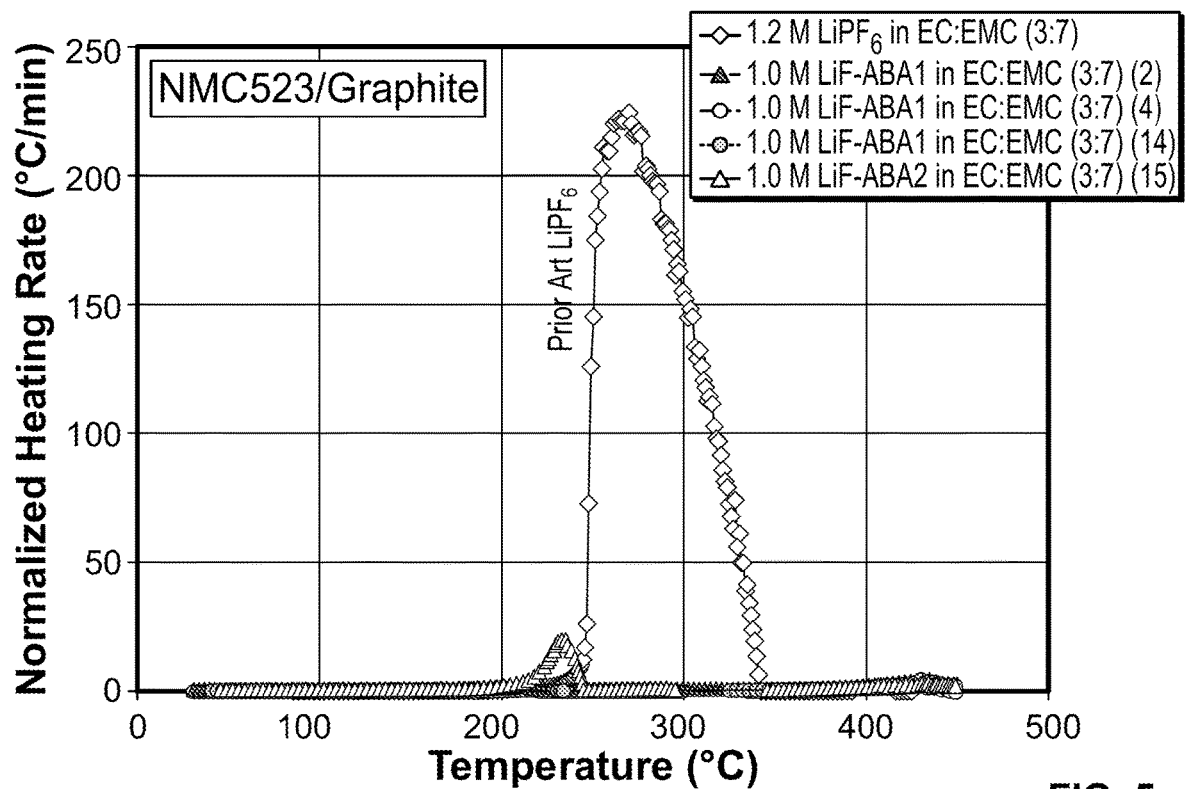
FIG. 5 is a graph illustrating the normalized heating rate as a function of temperature for a prior art cell and four purified ABA-based electrolyte cells in accordance with one or more embodiments of the present invention.

Thermal runaway energetics are quantified by using the maximum heating rate from the peak height as a measure of the heat release kinetics and the total temperature rise from the peak width as a measure of the runaway enthalpy (or total heat). FIG. 5 illustrates the normalized heating rate for a prior art, baseline cell with LiPF$_6$, which shows typical thermal runaway behavior for this cell chemistry with peak heating rates on the order of hundreds of degrees centigrade per minute. FIG. 5 also illustrates four different cells containing purified ABA-based electrolytes, which repeatedly show significantly lower peak heating rates. As the peak normalized heating rate for the worst of the four purified ABA-based electrolyte cells was less than 25° C./min, this is almost a full order of magnitude less than the prior art, baseline cell with LiPF$_6$. In alternative embodiments of the present invention the peak normalized heating rate is less than 50° C./min and less than 100° C./min. Further, the peak normalized heating rate for the best of the four purified ABA-based electrolyte cells was approximately 1° C./min, which is more than two full orders of magnitude less than the prior art, baseline cell with $LiPF_6$. By integrating the area of the heating rate versus time, one can determine the total heat output, which is significantly less for the purified ABA-based electrolyte cells compared to the prior art, baseline cell with $LiPF_6$. The purified ABA-based electrolyte cells thus provide a significant safety advantage over the prior art, baseline $LiPF_6$ cells.

Figure 6:
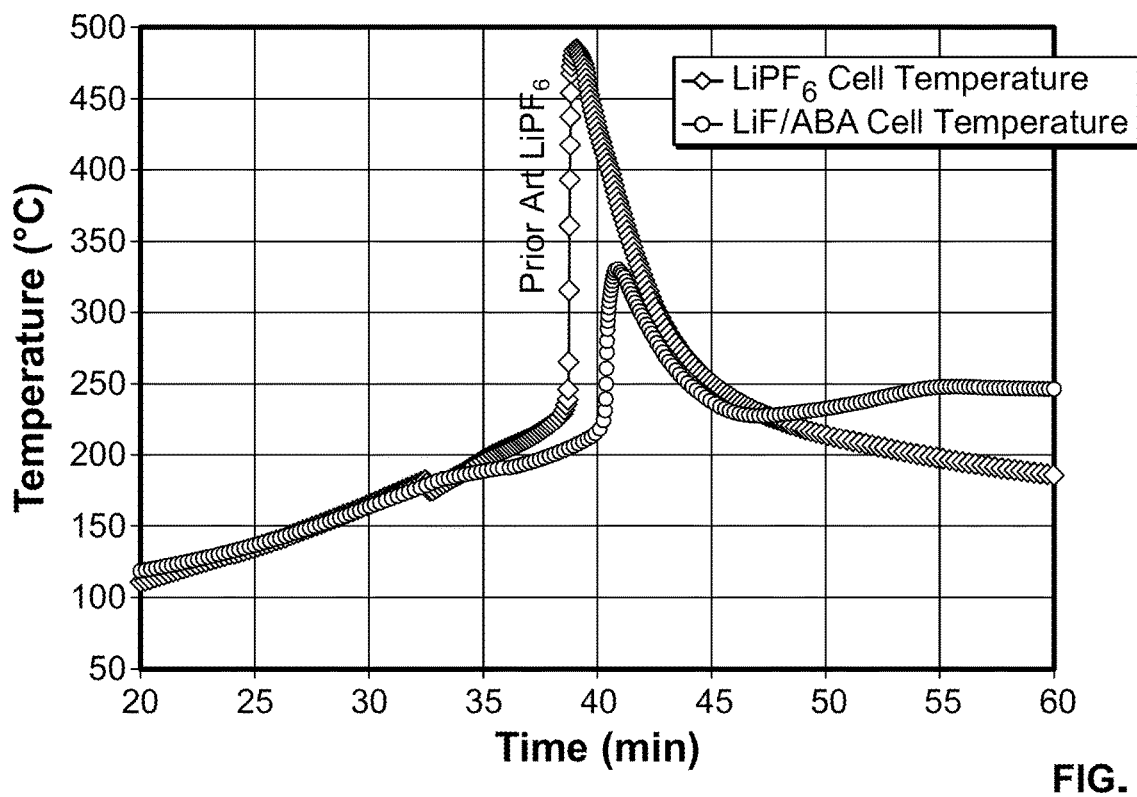
FIG. 6 is a graph illustrating the thermal runaway temperature as a function of time at a heating rate of approximately 5° C./min for a prior art cell and four purified ABA-based electrolyte cells in accordance with one or more embodiments of the present invention.

FIG. 6 illustrates the thermal runaway characteristics for a pair of cells. The first cell is again the prior art, baseline $LiPF_6$ cell, while the second is the purified ABA-based electrolyte cell. As shown in FIG. 6, the peak temperature reached by the prior art, baseline $LiPF_6$ cell approached 500° C., while the peak temperature for the purified ABA-based electrolyte cell was approximately 325° C., a difference of greater than 150° C. Further, the duration of the thermal runaway event for the prior art, baseline $LiPF_6$ cell at a 250° C. threshold was approximately seven minutes. In contrast, the purified ABA-based electrolyte cell runaway event duration at the same 250° C. threshold was approximately three minutes, i.e., less than half the duration of the prior art, baseline $LiPF_6$ cell. Thus, the purified ABA-based electrolyte cell in accordance with at least one embodiment of the present invention showed advantages over the prior art, baseline $LiPF_6$ cell in terms of both peak temperature and duration should a thermal runaway event occur.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A process for synthesizing a purified lithium salt comprising the steps of:
    dissolving at least one boron-based acid and at least one of an oxalic and a malonic acid in a first solvent to form a first solution;
    refluxing the first solution and removing water therefrom using distillation to form a first mixture;
    vacuum filtrating the first mixture to form a first filtrate;
    washing the first filtrate with a non-polar solvent to form an anion binding agent;
    dissolving the anion binding agent in a polar solvent to form a second solution;
    adding a small fluorinated salt to the second solution to form a second mixture;
    filtering the second mixture to form a second filtrate; and
    evaporating the second filtrate to obtain the purified lithium salt.

2. The process of claim 1, wherein the boron-based acid includes at least one of pentafluorobenzene boronic acid, trifluoromethyl boronic acid, and pentachlorobenzene boronic acid.

3. The process of claim 1, wherein the first solvent includes one or more of acetone, toluene, dimethyl sulfoxide, methanol, and dimethylcarbonate.

4. The process of claim 1, wherein the non-polar solvent is diethyl ether.

5. The process of claim 1, wherein the polar solvent is acetone.

6. The process of claim 1, wherein the small fluorinated salt is lithium fluoride (LiF) or lithium tetrafluoroborate ($LiBF_4$).

7. The process of claim 1, wherein a peak normalized heating rate for the purified lithium salt is less than 25° C./min.

8. A process for synthesizing a purified lithium salt comprising the steps of:
    dissolving at least one boron-based acid in a first solvent to form a first solution;
    adding hydrofluoric acid to the first solution to form a second solution;
    adding potassium hydroxide to the second solution to form a first precipitate;
    collecting the first precipitate by vacuum filtration to form a first filtrate;
    washing the first filtrate with methanol to form a third solution;
    drying the third solution to form an anion binding agent;
    adding $LiBF_4$ to the anion binding agent to form a second precipitate;
    filtering the second precipitate to form a second filtrate; and
    evaporating the second filtrate to obtain the purified lithium salt.

9. The process of claim 8, wherein the boron-based acid includes at least one of pentafluorobenzene boronic acid, trifluoromethyl boronic acid, and pentachlorobenzene boronic acid.

10. The process of claim 8, wherein the first solvent includes one or more of acetone, toluene, dimethyl sulfoxide, methanol, and dimethylcarbonate.

11. The process of claim 8, wherein a peak normalized heating rate for the purified lithium salt is less than 25° C./min.

* * * * *